United States Patent [19]
Haugli et al.

[11] Patent Number: 5,914,944
[45] Date of Patent: Jun. 22, 1999

[54] METHOD OF IMPROVING EFFICIENCY OF RADIO CHANNEL USAGE IN OVERLAPPING COVERAGE AREAS

[75] Inventors: Hans-Christian Haugli, Rockcliffe Park; William Robert Seed, Kanata, both of Canada

[73] Assignee: Vistar Telecommunications Inc., Ottawa, Canada

[21] Appl. No.: 08/760,207

[22] Filed: Dec. 4, 1996

Related U.S. Application Data

[60] Provisional application No. 60/008,320, Dec. 7, 1995, and application No. 60/018,138, May 29, 1996.

[51] Int. Cl.[6] ............................ G06F 11/00; H04B 7/185; H04B 7/216; H04J 13/02
[52] U.S. Cl. .......................... 370/320; 370/321; 370/354; 471/38.1; 471/39.1; 455/13.1
[58] Field of Search .................................... 370/319, 320, 370/321, 335, 337, 342, 347, 349, 445, 447, 461, 462, 312, 313, 314; 342/352, 353, 354, 358, 361; 371/37.01, 38.1, 39.1; 375/200; 455/12.1, 13.1, 13.2, 13.3, 427, 428, 430, 434, 507, 515

[56] References Cited

U.S. PATENT DOCUMENTS

| | | | |
|---|---|---|---|
| Re. 32,905 | 4/1989 | Baran | 375/200 |
| 4,145,658 | 3/1979 | Acampora et al. | 455/129 |
| 4,256,925 | 3/1981 | Goode | 370/322 |
| 4,319,353 | 3/1982 | Alvarez et al. | 370/321 |
| 4,532,635 | 7/1985 | Mangulis | 370/316 |
| 4,686,672 | 8/1987 | Namiki | 370/321 |
| 4,715,033 | 12/1987 | Saburi | 370/321 |
| 4,731,783 | 3/1988 | Fontanes | 370/321 |
| 4,901,307 | 2/1990 | Gilhousen et al. | 370/320 |
| 4,905,221 | 2/1990 | Ichiyoshi | 370/316 |
| 4,985,706 | 1/1991 | Schukat | 342/352 |
| 5,444,449 | 8/1995 | Poskett et al. | 342/354 |

*Primary Examiner*—Alpus H. Hsu
*Attorney, Agent, or Firm*—Marks & Clerk

[57] ABSTRACT

A method is described for transmitting a signal over a wireless communications channel, the communications channel being common to primary and secondary communications systems that have at least partially overlapping areas of coverage. The primary system has a low duty cycle and transmits random bursts having a characteristic first duration. The method involves transmitting bursts on the secondary system, which have a duration at least equal to three times the first duration and contain forward error correcting codes to permit data contained therein to be recovered in the event of a collision with a burst on the primary system. The bursts on the secondary system have an intensity sufficiently below the intensity of the bursts on the primary system to avoid interference therewith.

18 Claims, 11 Drawing Sheets

METHOD OF IMPROVING EFFICIENCY OF RADIO CHANNEL USAGE IN OVERLAPPING COVERAGE AREAS

This application claims the benefit under 35 U.S.C. 119(e) of prior U.S. provisional application Ser. Nos. 60/008,320, filed Dec. 7, 1995, and 60/018,138, filed May 29, 1996.

BACKGROUND OF THE INVENTION

This invention relates to a method and apparatus for improving efficiency of radio channel usage in overlapping coverage areas, for example, overlapping satellite beams.

With the trend toward increasingly small cells in cellular communications systems and the use of spot beams in satellite systems, areas of coverage overlap inevitably occur. In such areas, frequency re-use cannot occur if the systems are sensitive to interference. For example, consider a primary system of many users distributed over a service area, transmitting information back on a single channel to a common hub receive station. Assume there is also a secondary communications system wishing to utilize the same communications channel, again from many users to a common hub receive station, having a coverage area that at least partially overlaps the primary system. In order for the secondary system not to interfere with the primary system, conventionally under such circumstances the two systems would be allocated different channel frequencies. Given that in the case of satellite channels, the annual cost of 20 KHz bandwidth can be in excess one million dollars, this can be a very inefficient solution when the loading of the channels is not high.

The growth in demand for wireless communications systems has made spectrum space an extremely valuable commodity. For mobile satellite services (MSS), this demand has fueled proposals for numerous second and third generation mobile satellite systems. The increase in demand for spectrum that can support the various wireless services has resulted in a desire to more efficiently use existing spectrum. Clearly, the reuse of previously allocated spectrum without adversely affecting existing systems represents an increase in the utilization and efficiency of spectrum.

System design trade-offs for the mobile user have led to the deployment of satellite communications systems featuring low antenna gain terminals and, with the second and third generation of satellite systems, high gain satellite spot beams. As a consequence of the terminal mobility, the orientation between the terminal and the satellite can change significantly and over short periods of time.

A further consequence of using a low gain antenna at the terminal is that frequency reuse by other satellites and systems is severely limited. The transmissions from a low antenna gain terminal may be received by any satellite which covers the same frequency band and same coverage area as an existing satellite system.

Satellites and satellite systems which share common spectrum may not share the same geographical coverage when serving terminals with low gain antennas. Transmissions from users of a first satellite system, though transmitted using a low antenna gain, may not be received by a second satellite system operating at the same frequency band if there are differences in the satellite antenna ground coverage, and therefore may not interfere with users of the second satellite system. As a consequence of only partial overlap in geographical coverage between an existing satellite communications system and a second satellite communications system, a satellite communications channel on an existing satellite system that is heavily used, in the sense that the channel is occupied for a significant fraction of time, may appear to a second satellite system to be lightly loaded, in the sense that transmissions from users of the existing system are only occasionally received by the second system.

In order to increase transponder bandwidth utilization efficiency, many satellite communication systems operate in a demand assigned multiple access environment. Access request channels are used by a communications system to enable subscribers to be assigned satellite channel capacity for communications. For a random access request channel, such as slotted ALOHA, message loss increases rapidly when the number of offered messages is such as to approach full loading of the channel. As a result, nominal loading of a slotted ALOHA channel is usually held to about 20% of full loading.

An unslotted Aloha access request channel for similar reasons as for the slotted Aloha case, is designed to have an offered load of less than 0.1.

U.S. Pat. No. Re. 32,905 discloses a satellite communications system in which spread spectrum means are incorporated to enable a plurality of terminals, which feature low gain antennas, to concurrently generate spread spectrum CDMA transmissions over the same spectrum as used by existing systems, without interfering with users of the existing system. Furthermore, the system provides sufficient spread spectrum processing gain with its CDMA spread spectrum signal to substantially suppress interference caused by existing system transmissions. As a consequence of its processing gain, the system is able to process the CDMA spread spectrum transmissions generated concurrently by a plurality of terminals in the presence of interference from users of existing systems occupying the same spectrum, with an acceptable bit error rate, and without adversely affecting the users of the existing system. The techniques disclosed in the cited patent are applicable for those situations in which a sufficiently large spread spectrum processing gain can be achieved to substantially suppress existing system transmissions.

In the absence of sufficient spread spectrum processing gain to substantially remove interference caused by the transmissions of users of an existing system, the approach provided in the cited patent is ineffective. A processing gain that is insufficient to remove interference caused by users of existing systems may occur due a limitation in the bandwidth available for the spread spectrum signal, or by a relatively high information data rate, such that the ratio of spread spectrum bandwidth to information rate is too small to permit acceptable bit error rates in the presence of transmissions from an existing system.

An object of the invention is to alleviate this problem in a way which does not interfere with the primary users but still provides acceptable service to the secondary users.

SUMMARY OF THE INVENTION

According to the present invention there is provided a method of transmitting a signal over a wireless communications channel, said communications channel being common to primary and secondary communications systems that have at least partially overlapping areas of coverage, said primary system having a low duty cycle and transmitting random bursts having a characteristic first duration, said method comprising transmitting packets in bursts on said secondary system, said bursts on said secondary system having a duration at least equal to three times said first duration and containing forward error correction codes to permit data contained therein to be recovered in the event of a collision with a burst on the primary system, and said bursts on the secondary system having a power density sufficiently below the intensity of the bursts on the primary system to avoid interference therewith.

The performance can be further improved using interleaving and channel state information.

Interleaving is a process which scrambles in a predetermined manner the location of data symbols in a transmitted sequence, and descrambles the symbols back to their proper order at the input of the FEC decoder of the receiver. If a consecutive block of received symbols is corrupted due to interference, the descrambler will cause these errored symbols to be spread in time at the input of the FEC decoder. Time-spread symbols are much more tolerable to the FEC decoder than a block of errors.

The quality of a received signal (or "channel state") can be used to great advantage by the FEC decoder. Without channel state information the FEC deteriorates rapidly when the input error rate exceeds 1%. With channel state information, and the spreading of errors by the deinterleaver, the FEC decoder can tolerate up to 30% input error rate. In the case where the primary (interfering) received signal is much stronger than the secondary (desired) signal, a simple power detector at the receiver output can provide the channel state information to the FEC, as a large signal is equivalent to low desired signal quality.

The overlapping coverage areas may be formed by overlapping satellite beams, although the invention is applicable to other situations where overlapping coverage areas occur, for example, in cellular radio.

The secondary burst duration should be typically at least three times the primary burst duration and possibly up to ten times or more. The secondary bursts are advantageously transmitted using spread spectrum techniques at a power level below the noise floor of the primary system.

It is assumed that the primary and secondary systems each have their own service area, and there is at least partial overlap of these service areas. Users of these systems are distributed over their respective service areas. The primary system has many transmitters, but the overall duty cycle (or loading) of transmissions on the selected channel is low. Both the primary and secondary users transmit in bursts on the selected channel.

With the aid of forward error correction, and preferably interleaving and channel state information, successful decoding of a secondary user burst even can occur if ⅓ of the burst has been corrupted by the simultaneous reception of a primary burst.

Although the system can be used to advantage in the event of 100% overlap of coverage the system works best in the event of partial overlap. First consider the ability of the secondary system to function in the presence of the primary users. The duty cycle of primary bursts in the channel is low. Because the service areas of the two systems only partially overlap, only a fraction of these primary user bursts will be received at the secondary receiver, corresponding to the fraction of primary users "visible" to the secondary receiver. It is assumed that whenever a primary burst is received by the secondary receiver, it will dominate (and hence corrupt) the received signal. The secondary receiver can tolerate up to ⅓ time overlap of primary bursts on any secondary burst, thus the probability of unrecoverable corruption of a secondary burst becomes the probability that sufficient primary bursts occur in a secondary burst period to overlap more than ⅓ of the period.

Assume there are K primary bursts per second of length L seconds. The channel "on" duty cycle for the primary system becomes K*L. Assume further that a fraction M of the primary bursts are within the footprint of the secondary receiver, so that K*L*M represents the fraction of time that primary bursts are received by the secondary receiver. The secondary bursts are assumed to be of length N*L, where N>3. The probability that more than N*L/3 of the secondary burst is overlapped by the primary bursts is given by:

$$\sum_{I=\frac{N}{3}}^{\infty} (K \times L \times M \times N)^I \times \frac{e^{(K \times L \times M \times N)}}{I!}$$

As an example, assume primary bursts of length L=28 msec, with K*L*M=0.02, and a secondary burst length of N*L=0.5 second. The probability that more than 167 msec of a secondary burst is overlapped by primary bursts is $3 \times 10^{-6}$.

The second factor for shared use of the channel is interference from the secondary users into the primary system receiver. The secondary users are assumed to operate at an effective power level which is sufficiently below that of the primary users so that any interference would be well below the noise level of the primary system. Additionally, only a fraction of the secondary users will be received by the primary receiver, due to the limited overlap of service areas.

To continue the example, consider a satellite application, with the primary system being Inmarsat B, Atlantic beam, and the secondary system using the AMSC Eastern beam. The spectrum chosen for sharing is one of the Inmarsat access request channels, which is operated in slotted ALOHA (i.e. random access to the channel of the request bursts, with bursts synchronized to start at specific times). The practical limit for channel utilization in slotted ALOHA is about 20% of channel capacity. The uplink (satellite receive) footprint of the AMSC Eastern beam overlaps about 10% of the Inmarsat Atlantic beam, so that the AMSC system would experience uplink interference from about 10% of the Inmarsat uplink transmissions. Thus the fraction of time that primary bursts are received by the secondary receiver in this channel is 0.2*0.1=0.02, or 2% of the time, on average. The Inmarsat B request bursts are 28 ms long, while the bursts of the secondary system are 0.5 sec long. The probability of unrecoverable corruption of the secondary burst due to the received primary bursts, as calculated above, is $3 \times 10^{-6}$.

Inmarsat B transmitters operate with an EIRP which is 34 dB higher than that of the secondary system transmitters; however since the secondary system uses spread spectrum multiple access with a nominal 10 simultaneous users, the total secondary burst power will be (on the average) 24 dB below that of the primary burst, which will be well below the primary receiver's noise level.

The invention also provides a wireless communications system capable of sharing bandwidth with a primary system, said systems having at least partially overlapping areas of coverage, said primary system having a low duty cycle and transmitting random burst bursts having a characteristic first duration, said communications system comprising a plurality of distributed terminals for transmitting packets in bursts, said bursts on said communications system having a duration at least equal to three times said first duration, and said packets containing forward error correction codes to permit data contained therein to be recovered in the event of a collision with a burst on the primary system, and said bursts on said communications system having an intensity sufficiently below the intensity of the bursts on the primary system to avoid interference therewith.

BRIEF DESCRIPTION OF THE DRAWINGS

The invention will now be described in more detail, by way of example, only with reference to the accompanying drawings, in which.

DESCRIPTION OF THE PREFERRED EMBODIMENTS

Figure 1:
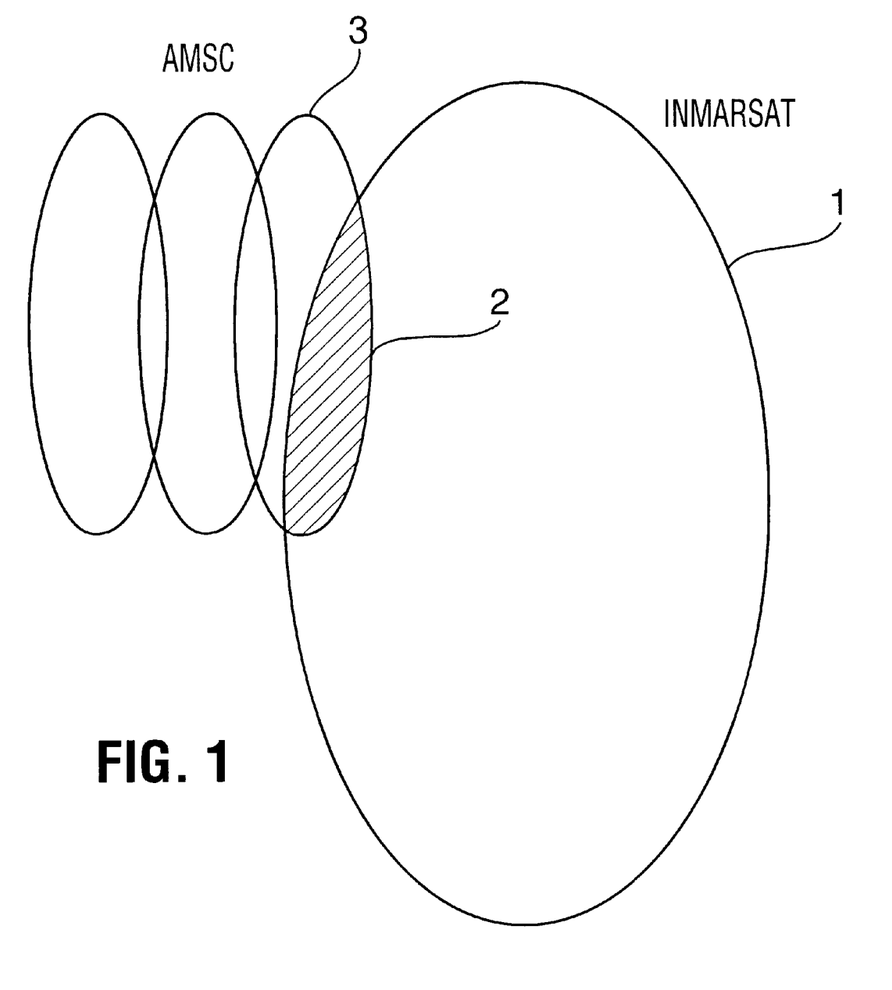
FIG. 1 is a diagram showing areas of overlapping satellite coverage.

Referring now to FIG. 1, the INMARSAT system covers a large area 1 and partially overlaps in shaded area 2 with AMSC beams 3. Traditionally, because of this overlap, the AMSC and INMARSAT satellites would be required to operate on different frequencies to avoid interference. This is wasteful of bandwidth, especially when the duty cycle of the INMARSAT system is low as it is on the request channels. The INMARSAT system employs separate random access request channels which are used when a customer wishes to set up a call. The call itself is established on communications channels which have a much higher duty cycle and are not generally suitable for the channel sharing arrangement proposed herein.

The effective duty cycle of the INMARSAT request channels visible to the AMSC system is reduced still further by virtue of the fact that requests originating far from the area of overlap will not collide with messages originating within the AMSC system. Collisions will only occur when a request originates in or close to the area of overlap, thus reducing the probability of collision to a level much lower than would be the case in the event of 100% overlap where all requests originating in the INMARSAT system would be seen by the AMSC system.

Figure 2:
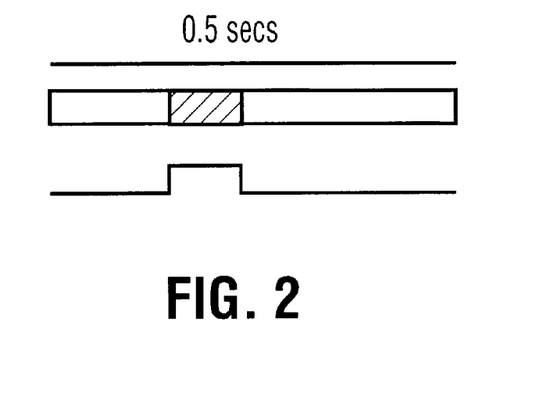
FIG. 2 shows a transmitted r.f. pulse.

The present system transmits data within basic units known as subframes as will be discussed in more detail below. The subframes, which are CDMA coded, appear as bursts of rf energy 0.5 secs long. The INMARSAT bursts on the request channel are much shorter, in the order of 28 msecs. Due to the low duty cycle on the request channel in the INMARSAT system and the partial overlap, which further reduces the effective duty cycle as visible to the AMSC system the probability of an INMARSAT burst colliding with an AMSC burst is low so the chances are that the AMSC subframe will be received without interference. However, in the event of a single collision, because of the differing lengths of the packets, only a small portion of the subframe will be lost (see shaded area in FIG. 2) and this can be recovered using known forward error correcting techniques. The probability the packet being lost beyond recovery due to collision with INMARSAT bursts with the aid of FEC techniques is extremely low.

To prevent the AMSC signals from interfering with the INMARSAT signals, the signal strength is maintained typically more than 30 dB below the intensity of the INMARSAT signals. In one embodiment this is achieved using spread spectrum techniques although other schemes are possible. It should be appreciated that spread spectrum techniques in themselves do no overcome the interference problem because the INMARSAT B request channel is only 20 KHz wide and the rf burst when it is present fills the channel. Thus, it is not possible to obtain sufficient processing gain by the use of spread spectrum techniques alone to transmit data in the presence of the INMARSAT signal. Processing gain is only achieved with spread spectrum when a communications channel contains a limited number of signal spikes, not when the interfering signal covers the entire width of the channel. However, the use of spread spectrum techniques allows a low power density signal to be used, which can be recovered by despreading at the receiver. This low signal level ensures that in the event of a collision with an INMARSAT signal, the INMARSAT signal is not degraded, even though during the collision the spread spectrum signal is actually lost. Thus, the spread spectrum signal is not used to achieve processing gain, since this is not possible in the scenario envisaged by the invention, but rather to ensure that the signal level is sufficiently low that interference to the INMARSAT signal does not occur.

Figure 3:
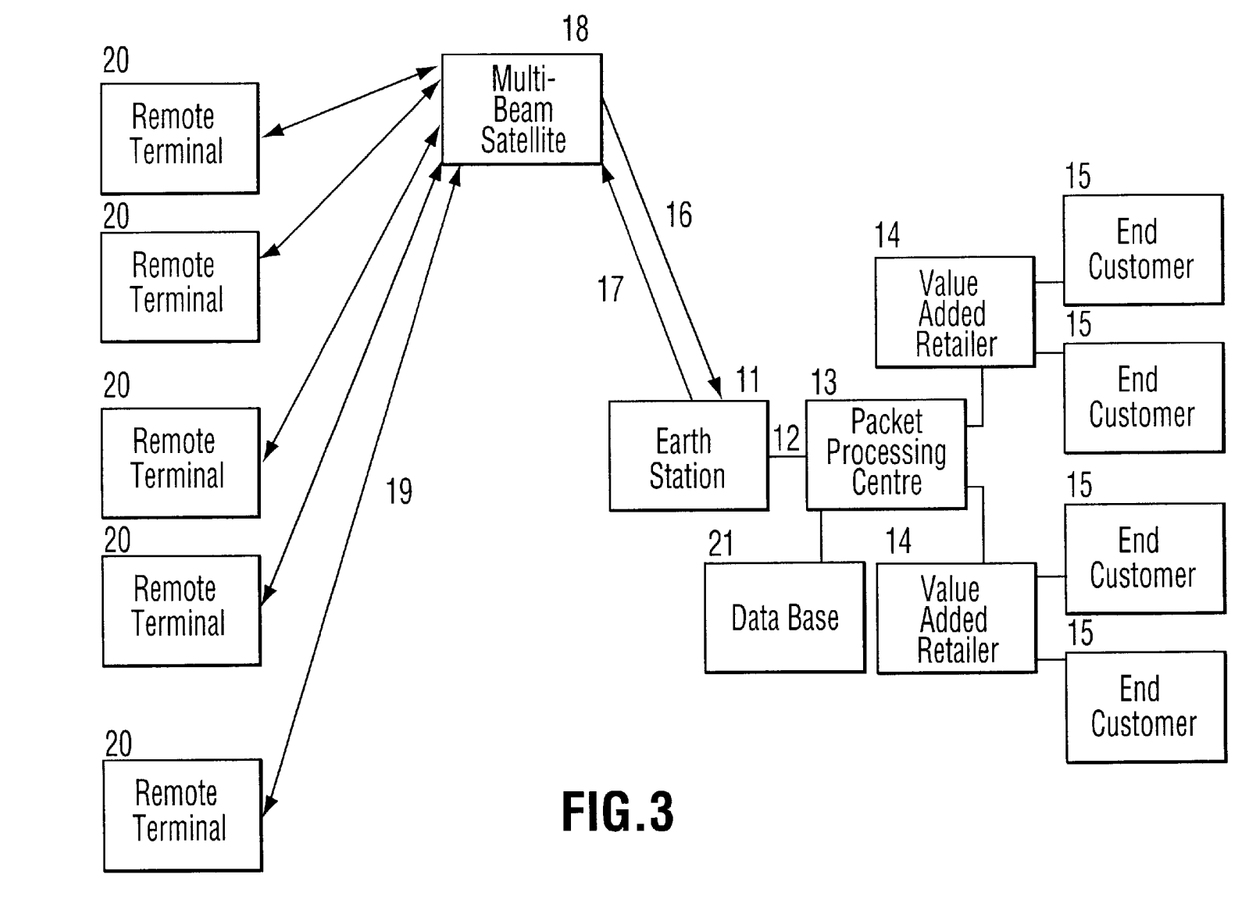
FIG. 3 is a functional block diagram of a satellite system.

The satellite communications system shown in FIG. 3 consists of a central Earth station 11 which is connected over a wired connection 12, for example, through a public switched network, to a packet processing center 13, normally operated by a service provider, which in turn is connected over a wired connection path to a value added retailer 14 and ultimately to one or more end customers 15. The packet processing center 13 includes a database 21 that stores information pertaining to the subframes allocated to particular terminals in a manner to be described in more detail below. The PPC 13 also stores beam information when multiple beam satellites are employed.

The Earth station 11 is also coupled by way of satellite links 16, 17 to a geostationary multi-beam satellite 18 which relays the signals via links 19 to and from a plurality of remote terminals 20, typically mounted on vehicles, such as helicopters, truck trailers, passenger cars, and rail cars. The satellite 18 permits coverage over a wide geographical area, such as the whole of North America, for example. The satellite 18 may broadcast to the entire coverage area although beam directing techniques allow this to be subdivided if desired. It will be understood that the links 19 shown in FIG. 3 represent point-to-point communications by virtue of the network access protocol to be described. The associated signals are broadcast over a wide geographic area.

The satellite communications link 17, 19 which originates at the earth station 11 and is relayed through a satellite 18 to the terminals 20, is referred to as the forward link. The satellite communications link 19, 16 which originates at the terminals 20 and is relayed through a satellite 18 to the earth station 11, is referred to as the return link. Those skilled in the art will acknowledge that the key elements of the present invention pertain to mobile as well as fixed terminals, to satellites in non-geostationary orbits and to terrestrial communication systems.

The manner in which the forward link transmission of the present invention is received and processed by the remote terminal is described with reference to FIG. 4. A portion of the transmission energy relayed by the geostationary satellite is captured by an antenna 40 of the Antenna Unit 47, and applied to a bandpass filter 41 which rejects signals outside the desired frequency band. Transmissions passed by the bandpass filter 41 are applied to an amplifier 42, which is enabled by a Tx/Rx sense module 46, and connected via coaxial cable 48 with a bandpass filter 52 of the Main Electronics Unit 50. The output signal of the bandpass filter 52 is supplied to a mixer 53 for downconversion to a convenient intermediate frequency (IF) by a frequency synthesizer 55 which is phase-locked to a local oscillator 64 and whose frequency is determined by a frequency controller 65.

The frequency controller 65 function is provided by a microprocessor 57. The output from the mixer 53 is applied to an IF bandpass filter 54 to further reduce the noise and electromagnetic interference near the frequency band of interest. The output from the bandpass filter 54 is applied to a quadrature detector 56 for downconversion to baseband by another output of the frequency synthesizer 55.

The in-phase (I) 58 and quadrature-phase (Q) 59 outputs of the quadrature detector 68 are supplied to analog-to-digital converters (ADC) 60. The digitized signals from the ADC 60 are converted to binary encoded symbols by a demodulator 61 and then decoded to binary data by a decoder 62 The ADC 60 demodulator 61 and decoder 62 functions are provided by a microprocessor 57. The output of the decoder 62 is written to an output buffer 77 which may subsequently provide the digital signals to external data sinks, such as computers and relays.

The timer logic 79 of in the microprocessor 57 enables the terminal to operate in a sleep mode and to wake up periodically to determine if it is to enter the transmit mode, receive mode or process mode. DC power is kept to a minimum when the microprocessor 57 is in sleep mode. The timer logic unit 79 wakes up the terminal during pre-assigned timeslots as will be described in more detail below.

The Tx/Rx sense module 46 senses the DC signal provided on the coaxial cable 48 as provided by the Tx/Rx control module 51. The Tx/Rx sense module will turn on the transmit amplifier 45 or receive amplifier 42 or neither as determined by the sensed DC level on coaxial cable 48. The Tx/Rx control module 51 is in turn controlled by microprocessor 57 to be active or inactive according to its current network access structure, described in a later figure.

Figure 4:
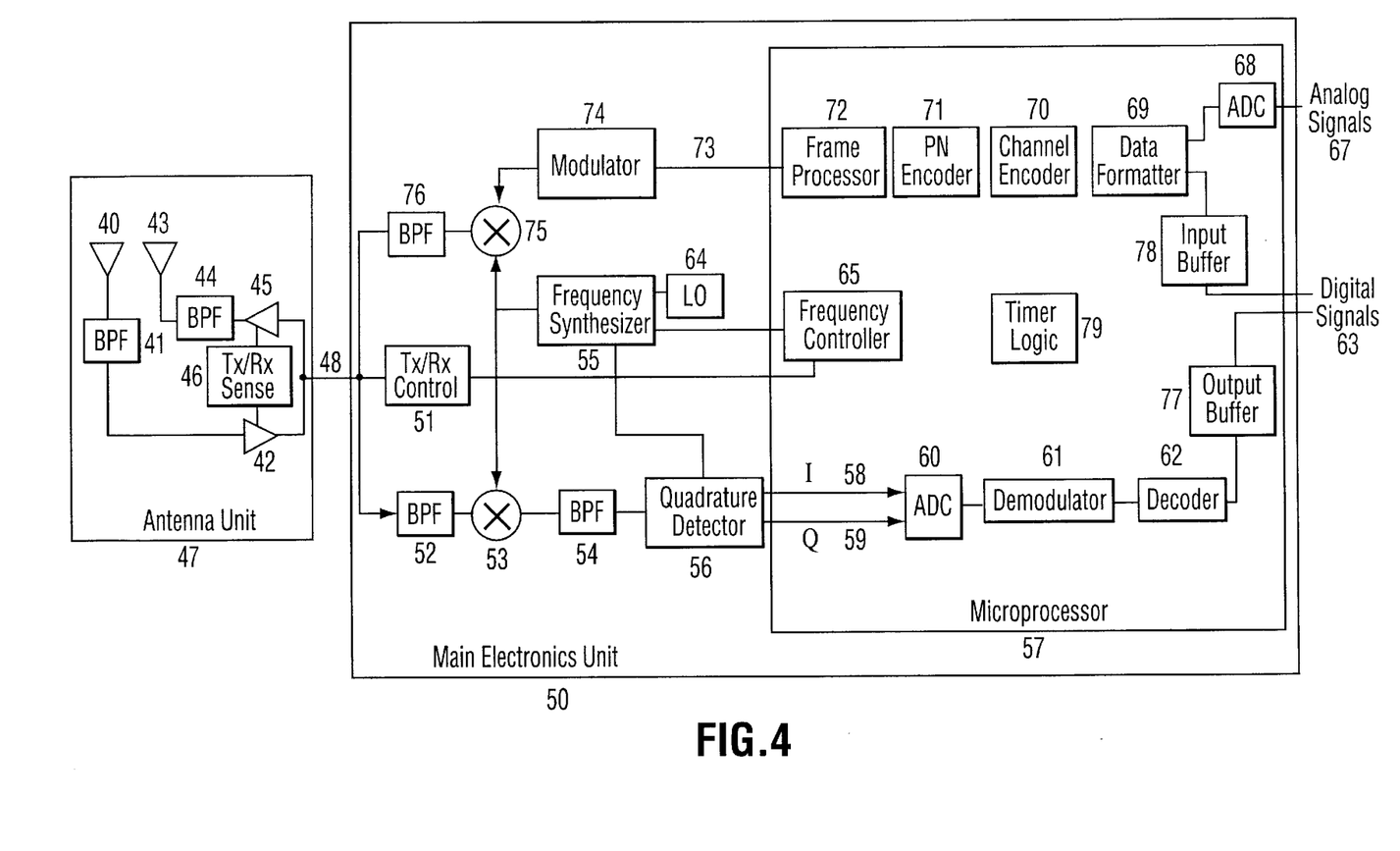
FIG. 4 is a functional block diagram of a remote terminal.

FIG. 4 also illustrates the return link spread spectrum CDMA transmission operated at the remote terminal. The source of the transmission may be analog 67, such as provided by an environmental sensor, is digitized by an ADC 68 provided on the microprocessor 57. Alternatively, the source of the transmission could be digital signal 63, such as from a computer, that would be written to an input buffer 78. The output of the input buffer 78 is subsequently applied to a data formatter 69, which packetizes the return link data signal and adds such information as the packet type, the destination and the packet originator. The output from the data formatter 69 is delivered to a channel encoder 70 which provides both robust forward error correction and interleaves the symbols of the return link packets. The channel encoder 70 output is then applied to a PN encoder 71 which may also be referred to as a CDMA spread spectrum encoder. The output from the PN encoder 71 is sent to a frame processor 72 that embeds the encoded, spread spectrum packet into the return link subframe structure.

The frame processor 72 supplies the binary PN encoded signal 73 to a modulator 74 which converts the signal to a QPSK waveform. A frequency synthesizer 55 is used to upconvert the baseband output of the modulator 74 at a mixer 75. The output of the mixer 75 is filtered using a bandpass filter 76 and connected via coaxial cable 48 with the antenna unit 47, where is it provided to a high power amplifier 45, in turn to a bandpass filter 44 and finally to an antenna 43 for transmission. The high power amplifier 45 is enabled by the Tx/Rx sense module 46 under the control of the Tx/Rx control unit 51.

Figure 5:
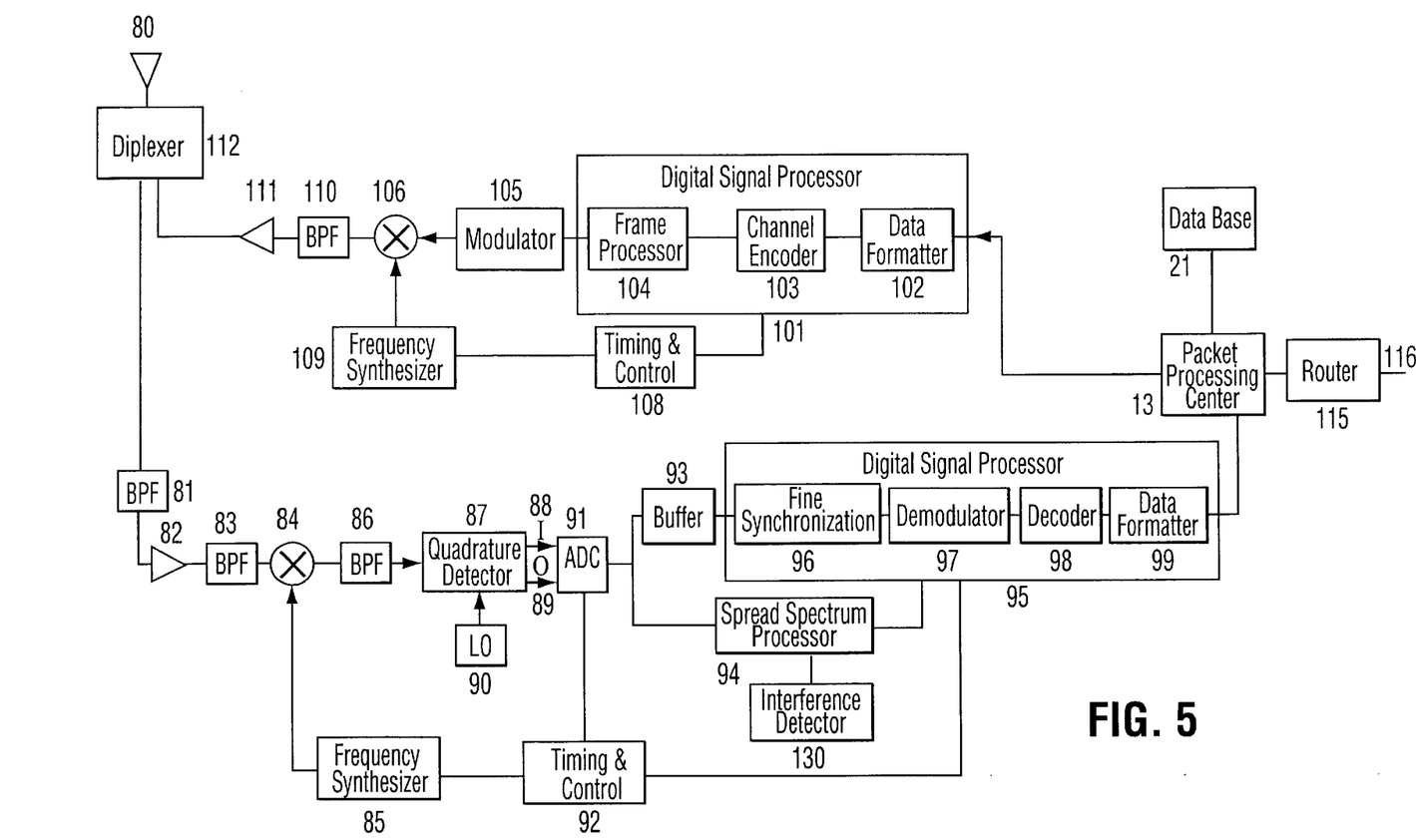
FIG. 5 is a functional block diagram of an Earth station.

Referring now to FIG. 5, the data to be sent to one or more remote terminals is delivered to the earth station using a wired correction 116 through a router 115 to a packet processing center 13. The packet processing center 13 then forwards the data packets to a data formatter 102. Each data packet delivered to the Earth station, includes the address of the target mobile terminal or a group of mobile terminals. Since the mobile terminal may have an individual and one or more group addresses, the forward link of the present invention supports concurrent communications with multiple mobile terminals.

The data formatter 102 places the data packets in subframes within a frame structure, which will be described in detail with reference to FIG. 6. The output of the data formatter 102 is passed to a channel encoder 103 for the application of forward error correction to help compensate for bit errors which may be caused by the satellite communications channel. The output of the channel encoder 103 is passed to a frame processor 104 which adds the encoded packets to a TDM forward link structure. The frame processor 104 mutes the forward link data packets when there is no data to be transmitted during all or part of a forward link subframe. The data formatter 102, channel decoder 103 and the processor 104 functions are provided within a digital signal processor 101.

The output from the frame processor 104 is connected to modulator 105 which converts the binary encoded data to a modulated BPSK waveform for subsequent upconversion at a mixer 106 by a carrier frequency signal supplied by a frequency synthesizer 109. The digital signal processor 101 and frequency synthesizer 109 are synchronized in time to the same subframe by a timing and control module 108. Timing control signals are provided by a timing and control unit 108 to transition the frequency synthesizer 109 at the correct time. The timing and control unit 108 also provides timing signals to the digital signal processor 101, to ensure that the encoded data signal from the frame processor 104 is time-aligned with the carrier frequency generated by the frequency synthesizer 109.

The output of the mixer 106 is applied to a bandpass filter 110 to minimize radio frequency (RF) emissions outside of the desired satellite communications spectrum. The output from the bandpass filter 110 is then delivered to an amplifier 111, which in turn provides the RF signal to a diplexer 112 and on to an antenna 80 for transmission to a geostationary satellite where it relayed to the remote terminal.

For the return link, an antenna 80 captures a portion of the return link signal and passes it to a diplexer 112 and then to a bandpass filter 81 which suppresses spectral energy outside of the desired return link frequency band. The output of the bandpass filter 81 is amplified using a low noise ampler (LNA) 82, and subsequently supplied to a mixer 84 for downconversion to a convenient intermediate frequency by a frequency synthesizer 85. The output of the mixer 84 is passed to a narrow bandpass filter 86 which further limits the spectral energy around the return link spread spectrum signal. The output of the bandpass filter 86 is provided to quadrature detector 87 for conversion to baseband by a local oscillator 90. In-phase 88 and quadrature phase 89 baseband signals are provided by the quadrature detector 87 for digital conversion by an ADC 91.

The digitized output from the ADC 91 is provided to a buffer 93 and a spread spectrum processor 94. A timing and control unit 92 provides the ADC 91 with a conversion trigger, the frequency synthesizer 85 with a frequency control word, and the spread spectrum processor 94 with timing signals. The buffer 93 stores over one subframe of samples of the spread spectrum signal for a digital signal processor 95. The spread digital signal processor 95 processes the digitized signal for the presence of CDMA transmissions from remote terminals of the present invention. The spread spectrum processor 94, which consists of multiple digital signal processors, provides concurrent processing of the digitized signal for all timing offset hypotheses and CDMA code possibilities.

The spread spectrum processor 94 detects the presence of remote terminal CDMA transmissions and provides an indication to the digital signal processor 95 of the detection of a CDMA transmission, the associated CDMA code and the approximate start of the transmission.

An interference detector 130 is provided to process the digitized signal for the presence of interference from existing satellite channels. Consider, for example, the sharing of the INMARSAT B return request channels, which are slotted ALOHA channels with perhaps 20% nominal occupancy, with the return link of the system operating through the Eastern beam of the AMSC system. Because of limited overlap of the antenna footprints of the two systems, the AMSC satellite receiver will receive less than 10% of the INMARSAT request packets. Thus, the return link will only need to contend with co-channel interference 2% of the time. Convolutional coding, interleaving and channel state information can cope with 30% blockage per packet. The rf signals are 34 dB below the Inmarsat carriers, so the present system will not degrade the Inmarsat system when it is overlaid onto Inmarsat carriers.

The fine synchronization unit 96 then provides fine time and frequency estimates on the detected CDMA transmissions. The output from the fine synchronization unit 96 consists of despread QPSK signals which are then supplied to a demodulator 97 for conversion to a binary, encoded data signal, and in turn to a decoder 98 for deinterleaving and forward error correction decoding. Channel state information can be obtained on a per sample basis from the sample amplitude in the buffer 93, and passed to the decoder 98. The output from the decoder 98 is provided to a data formatter 99 for conversion to a suitable format for the packet processing center 13. The packet processing center 13 then sends the return link packets to a router which delivers the packets to end customers using wired 116 means.

Figure 6:
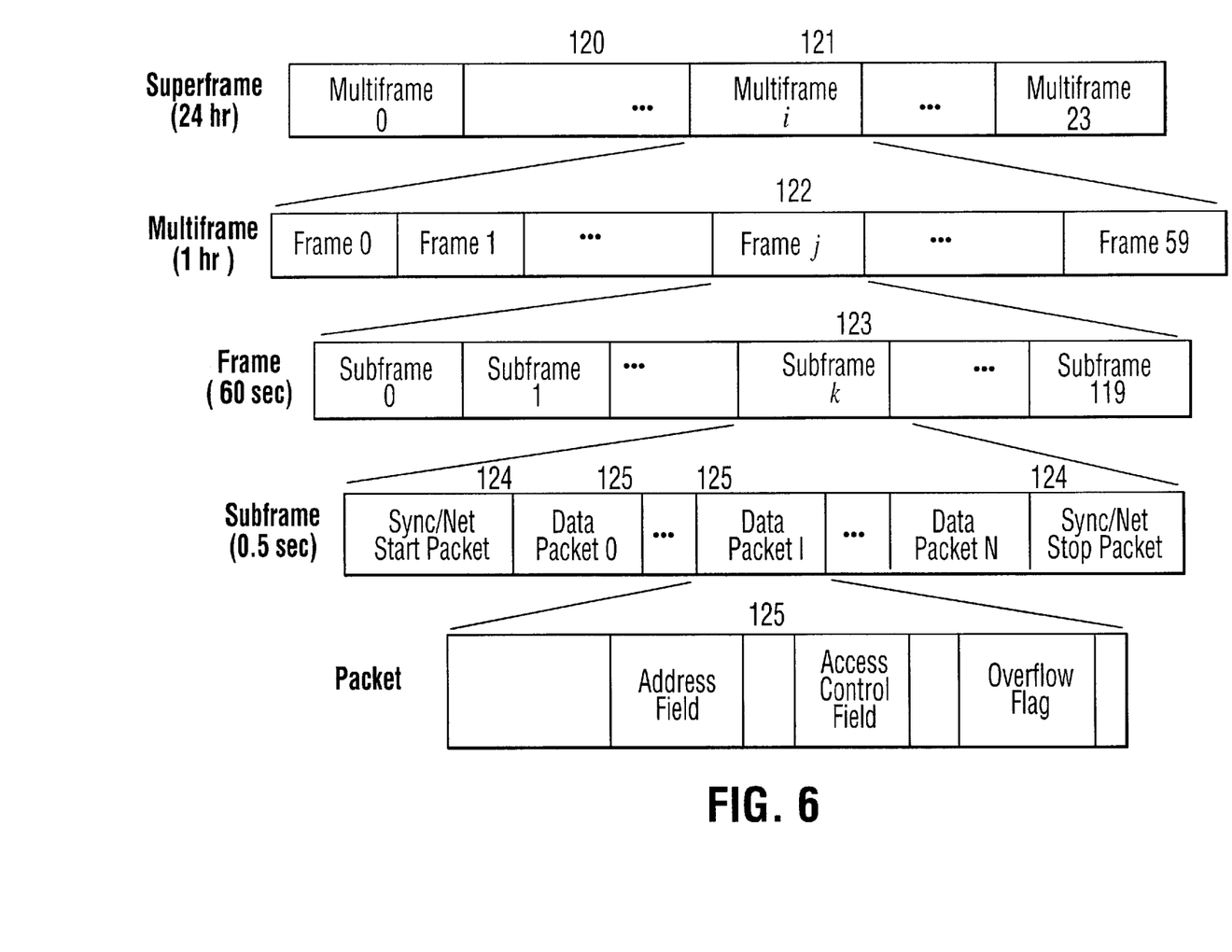
FIG. 6 is a diagram showing the forward link TDM structure.

The forward link TDM structure of the present invention is shown in FIG. 6 as a function of time. Forward link communications may be buffered up to superframes 120 having a length of about one day. Each superframe 120 is comprised of I equal length multiframes 121 having a length of approximately one hour. Each multiframe 121 in turn consists of J equal length frames 122 having a length of approximately one minute. A frame 122 is comprised of K equal-length subframes 123 with a repetition frequency of 0.5 secs., each of which is sub-divided into time slices carrying L time division multiplexed packets 124, 125 which are all equal in duration.

The first and last q packets 124 are referred as synchronization/network packets or simply as sync/network packet. The sync/network packets 124 provide the remote terminals with synchronization and network status aids.. Up to L-q data packets 125 may be transmitted over the remainder of a subframe. When there are no communications to be provided during a subframe or portions therein, the forward link signal will be muted. A number of data packets 125 are reserved on a frame basis for the provision of a network bulletin board, which includes such information as subframe to satellite channel mapping.

Each packet 125 may contain a number of separate fields such as an address field, an access control field, or an overflow flag, which is used to indicated that there is more data to follow in a subsequent subframe. The amount of data that can be sent in a subframe is limited to N data packets. Depending on the number of terminals it is desired to address and the amount of data to send, it may not be possible to send all the desired data in one subframe, after which the target terminal would normally return to the sleep mode. The overflow flag can be set to tell the terminal to stay awake because there is more data to follow for them in a subsequent subframe that would not normally be allocated to those terminals. Of course, if the overflow flag is set, the following packets take up timeslices in the next subframe that would normally be allocated to different terminals, so there is a trade-off between system capacity and accessibility.

A potentially limitless number of terminals may share a common active receive subframe. The number of terminals that may feasibly share a common active receive subframe is dependent on the amount of data to be carried and the frequency with which it is desired to send data to any particular terminal.

The L-q data packets 125 may be addressed to one or more of these terminals, or may be muted if there are no forward link packets to be transmitted. Each terminal, which has a unique address, that is active during a particular subframe processes all data packets 125 and subsequently determines the terminal(s) to whom the each packet is addressed. If a terminal does not detect its address among any of the L-q data packets 125, it enters the sleep mode and will remain inactive until its next active receive subframe or, if it is enabled for external interrupt, until interrupted by a local source. If a terminal does detect its address among the data packets 125, it further processes the respective packet (s) and responds accordingly.

Figure 7A:
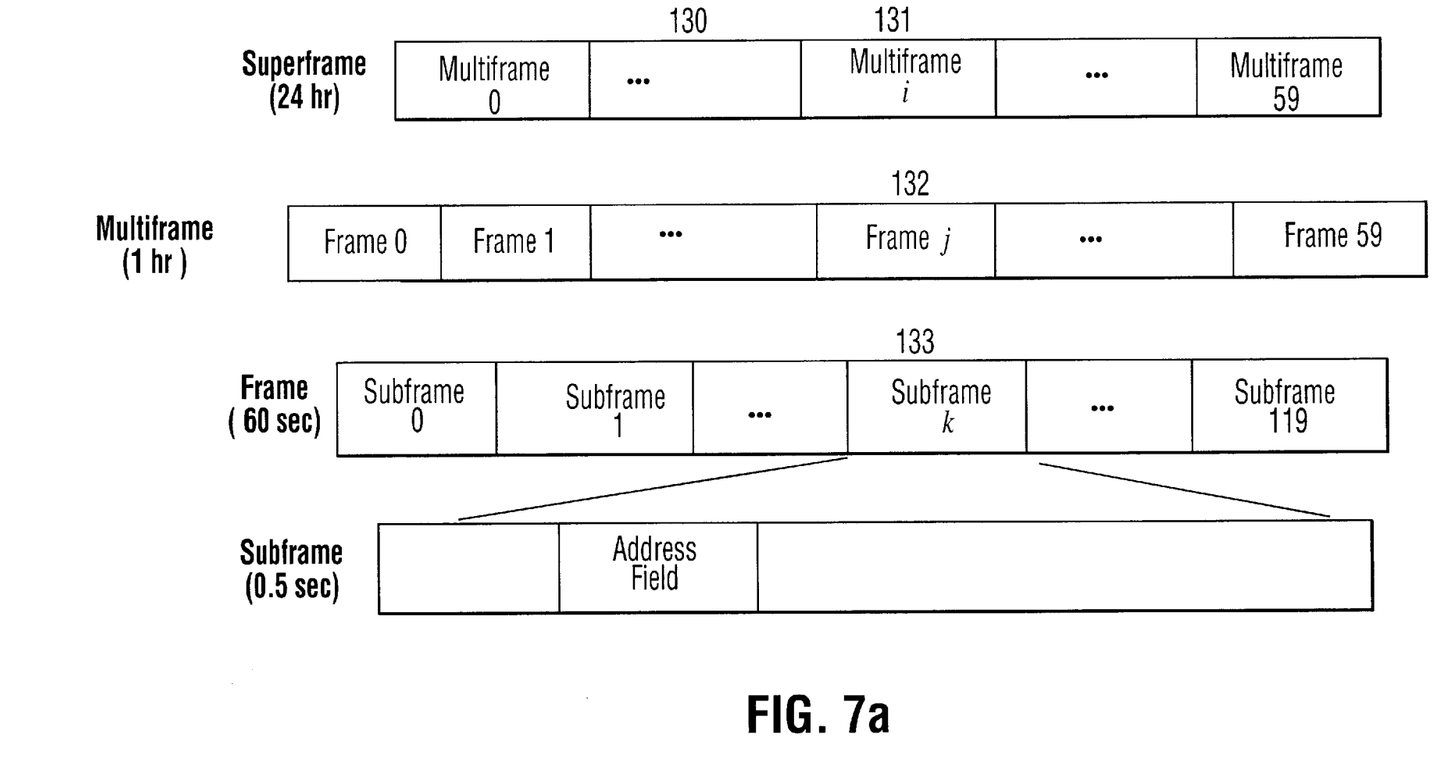
FIG. 7a is a diagram showing the return link slotted CDMA structure.

The return link frame structure shown in FIG. 7(a) is similar to that of the forward link described with reference to FIG. 6. Return link data may be buffered over superframes 130 having a repetition frequency of one day. Each superframe 130 consists of I multiframes 131 having a repetition frequency of one hour, and each multiframe 131 consists of J frames 132 with a length of one minute and comprised of K subframes 133 with a length of 0.5 secs.

Unlike the forward link, the subframes 132 in the return link are not subdivided. Each subframe carries data packets spread over the entire subframe that are multiplexed using CDMA multiplexing techniques.

Figure 7B:
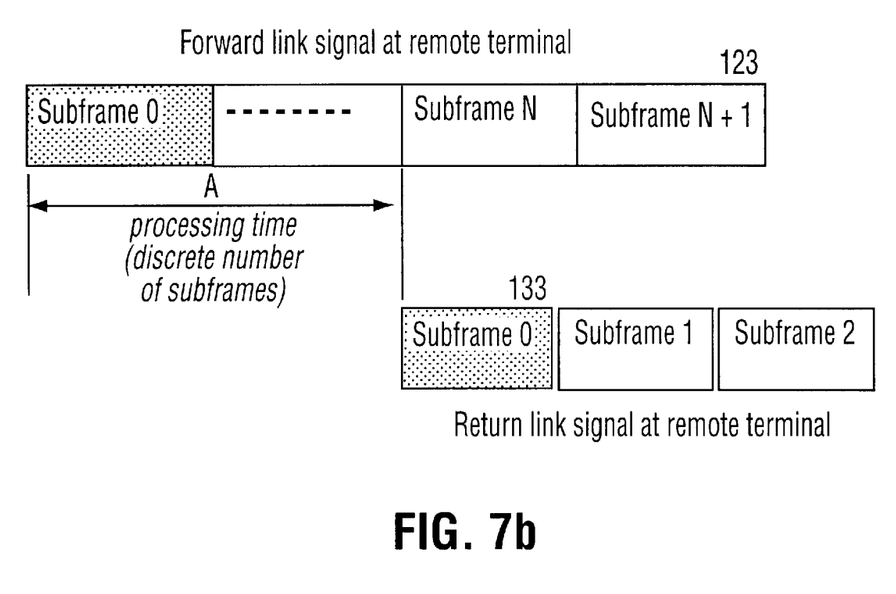
FIG. 7b is a diagram showing the timing synchronization of the forward and return link.

As shown in FIG. 7(b), the return link subframes 133 at the remote terminals are synchronized in time to the forward link subframes 123, being offset by a discrete number of subframes A. The forward link subframes 123 include up to L-q data packets which may be used to request a transmission from one or more remote terminals. For example, a request for a remote terminal transmission may be provided in particular forward link subframe. The forward link packet is then processed by the terminal(s), and results in a terminal transmission during a subsequent return link, offset in time by A subframes from the forward link subframe carrying the request.

Figure 8:
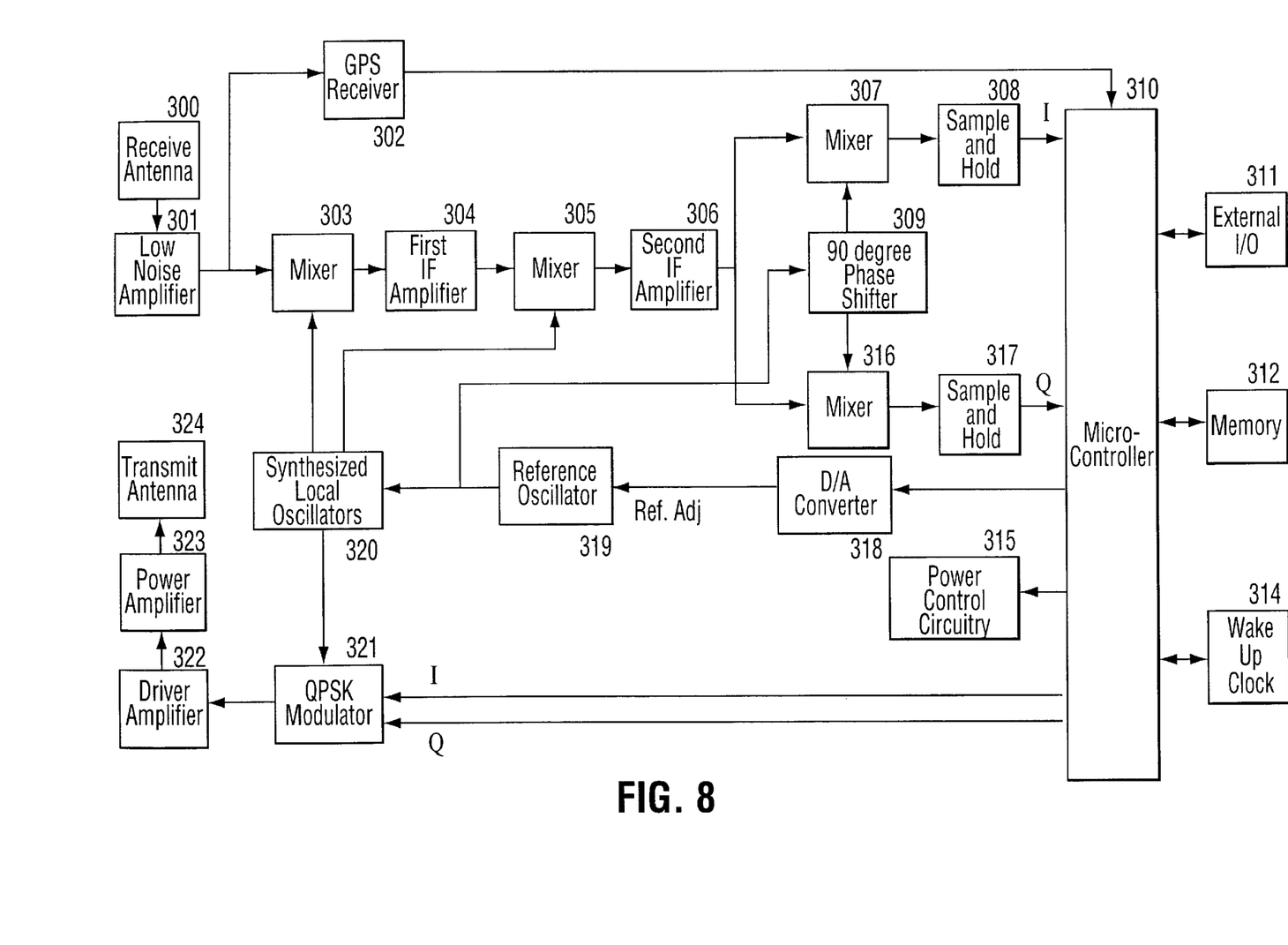
FIG. 8 is a block diagram of a second embodiment of a remote terminal.

FIG. 8 shows a second embodiment of the remote terminal. Signals from receive antenna 300 are passed through low noise amplifier 301 to mixer 303 and conventional GPS receiver 302 which sends the current position coordinates to microcontroller 310. Synthesized local oscillators 320, which are controlled by reference oscillator 319 whose frequency is adjusted by the microcontroller 310 via digital-to-analog converter 318 in a manner to be described, generate in mixer 303 an IF signal which is amplified in a first IF amplifier 304, mixed in mixer 305 to generate a second IF frequency, which is then amplified in second IF amplifier 306, from where it is passed through mixers 307, 316 and sample-and-hold circuits 308, 317 to microcontroller 310.

The output of reference oscillator 319 is connected through 90° phase shifter 309, whose outputs are connected to the second inputs of mixers 307, 316 to generate the in-phase I and quadrature Q components of the signal.

The microcontroller 310, for example a Phillips P80CL580 is connected to external I/O ports 311, memory 312 and wake-up clock 314, which periodically wakes up the terminal to receive incoming signals.

The microcontroller is connected to power control circuitry 315.

On the transmit side, the I and Q components of the signal are passed separately from the microcontroller 310 to QPSK modulator 321, which is driven by the synthesized local oscillators 320.

The output of the QPSK modulator is passed through driver 322 and power amplifier 323 to transmit antenna 324.

Figure 9:
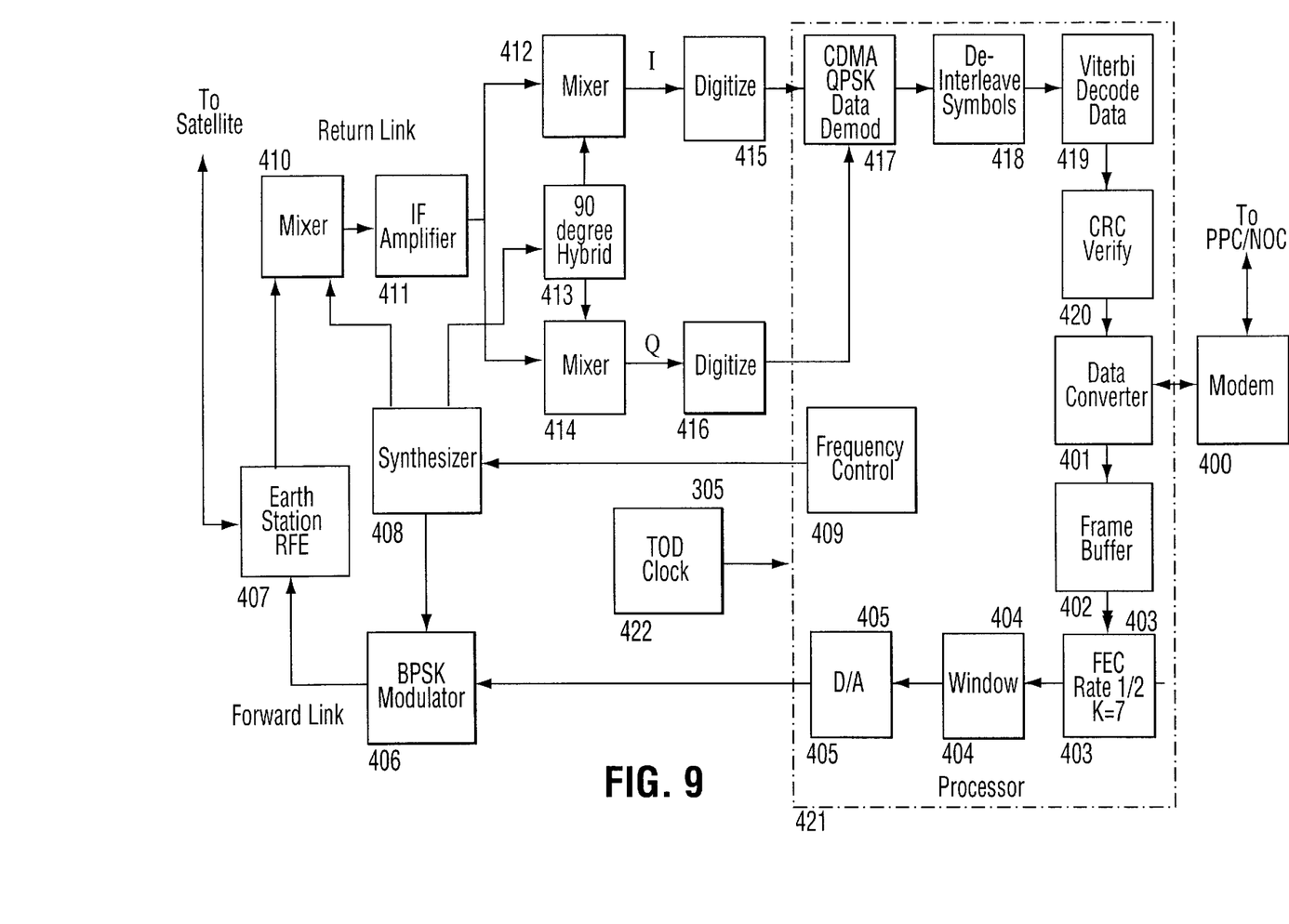
FIG. 9 is a block diagram of a second embodiment of an earth station.

The second embodiment of the earth station is shown in FIG. 9. Data from the PPC/NOC 13 is received via modem 400 and passed to data converter 401, which converts it into a format suitable for satellite transmission. From there it is passed through a buffer 402, and a FEC unit 403 for forward error correction, window unit 404, an digital-to-analog converter 405, and BPSK modulator 406. From there it is passed through the earth station RF equipment 407 to the satellite.

On the return path, the incoming CDMA signal is passed from the RF equipment 407 through mixer 410, IF amplifier 411 to mixers 412 and 414 for isolating the in-phase and quadrature components. These are digitized in units 415 and 416 and fed to CDMA/QPSK demodulator 417, symbol de-interleaver 418 and Viterbi decoder 419. Channel state information can be obtained on a per sample basis from the sample amplitude from the digitizers 415, 416 and passed to the decoder 419. After a CRC check 420, the signals are passed through data converter 410 and modem 400 back to the PPC/NOC 13.

Clock 422 is connected to processor 421, which performs the functions contained within the dotted box. Frequency control unit 409 within the processor controls synthesizer 408, which drives the IF mixer 410 and in-phase quadrature and mixers 412, 414 through 90° hybrid 413, and the BPSK modulator 406.

Figure 10:
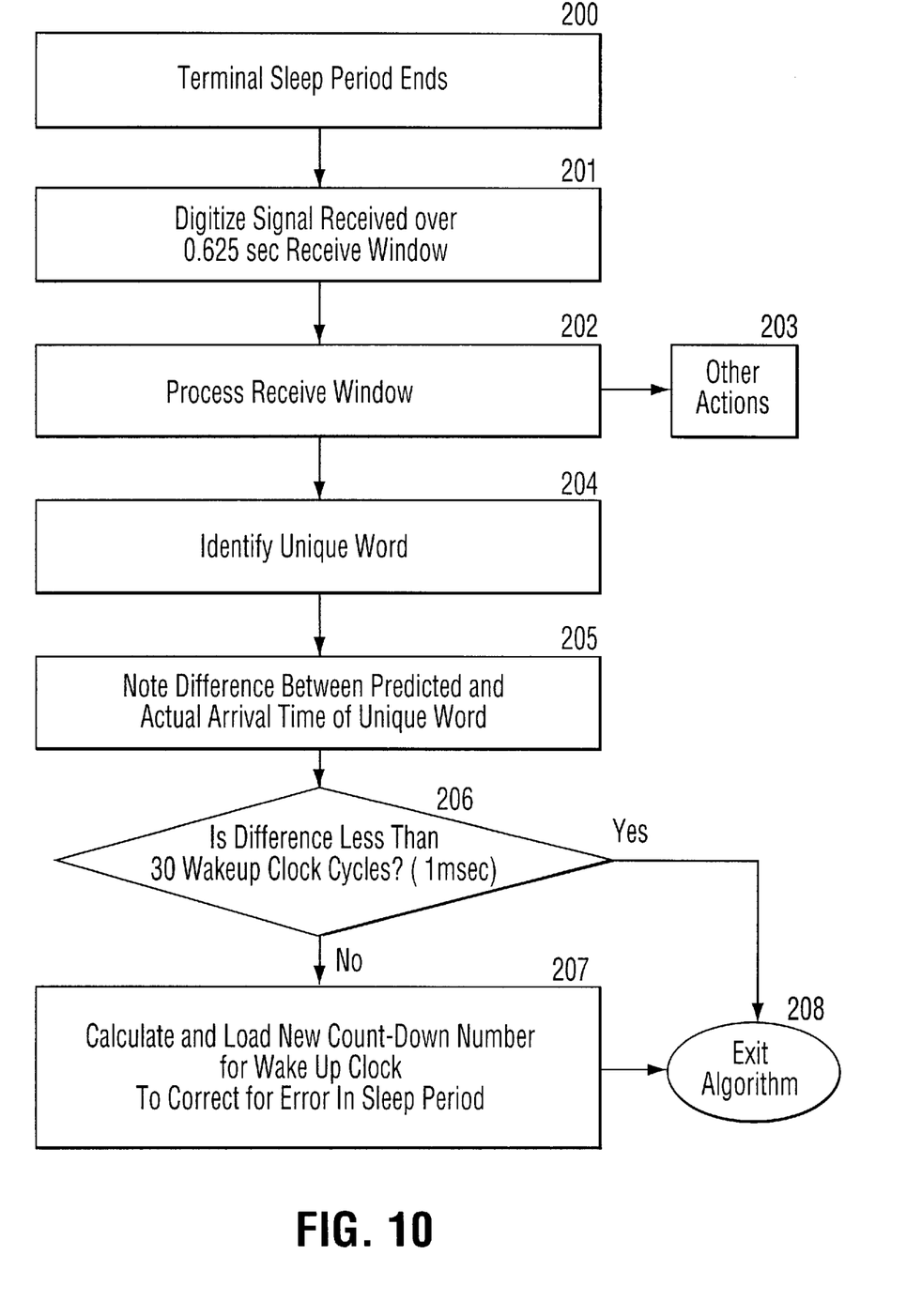
FIG. 10 illustrates the sleep clock synchronization algorithm for the remote terminal.

As indicated above, the timer logic or clock 79, 314 periodically wakes up the remote terminal to listen for incoming data. In order to minimize the cost of the terminals, it is desirable to use a low cost oscillator, which may be liable to drift. To correct this, the oscillator may wake up the terminal for a short time more frequently than the occurrence of its allocated subframe, for the purposes of resynchronizing the clock. For example, if a particular terminal is allocated only one subframe in the hierarchical frame structure, this will only repeat once every twenty-four hours, yet the clock may need to be reset more often than this. In one advantageous embodiment, the terminal may, for example, be woken up once every hour solely for synchronization purposes so as to ensure that when the next listening period comes round, the clock will be adequately synchronized to the earth station. FIG. 10 shows the algorithm for achieving this.

At step 200, for example, after one hour, the terminal sleep period ends and the timer 79, 314 typically a count-down timer, which draws minimal current in the sleep mode, wakes up the terminal just before the start of an anticipated incoming subframe on the forward link. The received signal is digitized over a 0.625 sec. receive window in step 201 so as to ensure that the window encompasses a complete 0.5 sec. subframe. The received window is processed at step 202 to identify a unique synchronization word carried by the subframe. At step 205, the difference between the actual and predicted time of arrival of the unique word is noted. Decision step 206 determines whether this difference is greater than a predetermined number of clock cycles, typically 30, and if so corrects the clock synchronization by loading a new number into the count-down timer's internal register.

The algorithm exits at step 208 and the terminal goes back to sleep until the next wake-up period. After processing of the receive window, other actions, such as the synchronization of the local oscillator frequency can also be taken at step 203. This process will be described with reference to FIG. 11.

Typically, the wake-up clock 79, 314 will run at 32 KHz and be divided down to 8 Hz to generate a pulse every 125 msecs. In one embodiment, the active state can be divided into two substates, a fully active state where the receive circuitry is switched on and a partly active state where only the microcontroller is switched on. Every 125 msces, the clock can wake up only the microcontroller 310, placing the terminal in the partly active state. The microcontroller checks to see whether it is time to listen for an incoming subframe. If not, it goes back to sleep. If it is, it switches on the receive circuitry to grab an incoming subframe, after which it switches off the receive circuitry, which next to the transmitter circuitry has the greatest power drain. It then digitizes the subframe, checks the clock synchronization and looks for data packets addressed to it.

Figure 11:
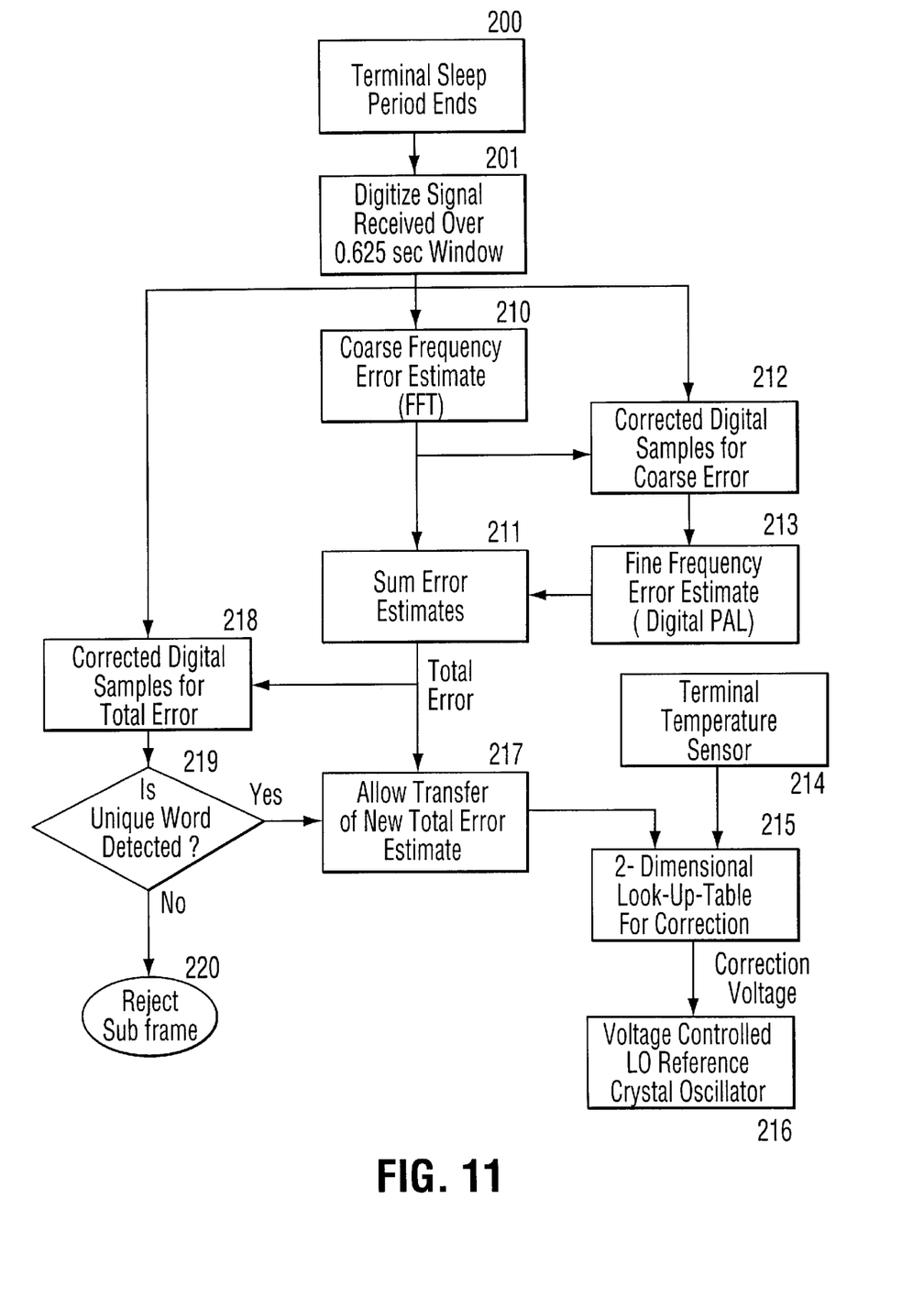
FIG. 11 shows the local oscillator synchronization algorithm for the remote terminal.

Referring now to FIG. 11, first a course frequency estimate is made with an FFT filter at step 210 and the digital samples corrected for coarse error at step 212. At step 213, a fine frequency estimate is made using a digital phase-locked loop. The sum of the error estimates is obtained at step 211 and the digital samples corrected for total error at step 218. Step 219 decides whether the unique synchronization word is detected, and if not the subframe is rejected. If the unique word is detected, the total error estimate is transferred to a two-dimensional look-up table 215 for voltage correction 216 of the voltage controlled reference oscillator 64, 319.

A temperature sensor 214 is connected to the look-up table so as to ensure that crystal oscillator 64, 319 is corrected for changes in temperature.

The described system can co-exist with a primary system without either system causing interference to the other, even though common frequencies are used.

We claim:

1. A method of sending data over a wireless communications channel, said communications channel being common to primary and secondary commuciations systems that have at least partially overlapping areas of coverage, said primary system having a low duty cycle and transmitting random bursts having a characteristic first duration, said method comprising transmitting packets in bursts on said secondary system, said bursts on said second system having a duration at least equal to three times said first duration and said packets containing forward error correction codes to permit data contained therein to be recovered in the event of a collision with a burst on the primary system, and said bursts on the secondary system having an intensity sufficiently below the intensity of the bursts on the primary system to avoid interference therewith.

2. A method as claimed in claim 1, wherein said packets employ symbol interleaving to improve error correction performance.

3. A method as claimed in claim 1, wherein the intensity of the bursts on said secondary system is at least 30 dB below the intensity of the bursts on said primary system.

4. A method as claimed in claim 1, wherein said transmitted bursts on said secondary system employ spread spectrum multiplexing techniques to bring the power level at a receiver for the primary system below the noise level of the primary system.

5. A method as claimed in claim 4, wherein said transmitted bursts on said secondary system employ code division multiple access multiplexing.

6. A method as claimed in claim 1, wherein said primary and secondary systems are satellite-based systems with overlapping beams.

7. A method as claimed in claim 2, wherein upon reception said packets are de-interleaved and error corrected taking into account channel state information.

8. A wireless communications system capable of sharing bandwidth with a primary system, said systems having at least partially overlapping areas of coverage, said primary system having a low duty cycle and transmitting random bursts having a characteristic first duration, said communications system comprising a plurality of distributed terminals for transmitting packets in bursts, said bursts on said communications system having a duration at least equal to three times said first duration, and said packets containing forward error correction codes to permit data contained therein to be recovered in the event of a collision with a burst on the primary system, and said bursts on said communications system having an intensity sufficiently below the intensity of the bursts on the primary system to avoid interference therewith.

9. A wireless communications system as claimed in claim 8, further comprising means for interleaving symbols in said packets to improve error correction.

10. A wireless communications system as claimed in claim 9, further comprising a channel state monitor, and a processor for de-interleaving and error correcting incoming packets, said processor being programmed to take into account channel state information while performing error correction.

11. A wireless communications systems as claimed in claim 8, wherein the intensity of the bursts on said communications system is at least 30 dB below the intensity of the bursts on said primary system.

12. A wireless communications system as claimed in claim 8, further comprising a transmitter for transmitting the bursts in said communications system using spread spectrum techniques to bring the power level of a received burst below the noise level of the primary system.

13. A wireless communications system as claimed in claim 12, wherein said bursts on said communications system employ code division multiple access multiplexing.

14. A wireless communications system as claimed in claim 12, wherein said systems are satellite-based with overlapping beams.

15. A terminal for use in a wireless communications system capable of sharing bandwidth with a primary system, said systems having at least partially overlapping areas of coverage, said primary system having a low duty cycle and transmitting random bursts having a characteristic first duration, said terminal comprising a transmitter for transmitting packets in bursts on said communications system having a duration at least equal to three times said first duration, and said packets containing forward error correction codes to permit data contained therein to be recovered in the event of a collision with a burst on the primary system, and said bursts on said communications system having an intensity sufficiently below the intensity of the bursts on the primary system to avoid interference therewith.

16. A terminal as claimed in claim 15, wherein said packets contain interleaved symbols to improve error correction.

17. A terminal as claimed in claim 16, wherein said terminals transmit bursts having an intensity at least 30 dB below the intensity of the bursts on the primary system.

18. A terminal as claimed in claim 15 adapted to communicate via satellite.

* * * * *